US008843481B1

(12) United States Patent
Xu

(10) Patent No.: US 8,843,481 B1
(45) Date of Patent: Sep. 23, 2014

(54) SYSTEM AND METHOD OF FORMING ACTION BASED VIRTUAL COMMUNITIES AND RELATED SEARCH MECHANISMS

(75) Inventor: Yongyong Xu, Sunnyvale, CA (US)

(73) Assignee: Yongyong Xu, Sunnyvale, CA (US)

( * ) Notice: Subject to any disclaimer, the term of this patent is extended or adjusted under 35 U.S.C. 154(b) by 0 days.

(21) Appl. No.: 11/542,325

(22) Filed: Oct. 2, 2006

Related U.S. Application Data

(60) Provisional application No. 60/596,524, filed on Sep. 30, 2005.

(51) Int. Cl.
*G06F 17/30* (2006.01)

(52) U.S. Cl.
USPC .......................................................... 707/732

(58) Field of Classification Search
USPC ............... 707/3, 5, 6, 10, 100, 201, 737, 732; 725/116; 706/20, 219; 705/80
See application file for complete search history.

(56) References Cited

U.S. PATENT DOCUMENTS

| 5,754,938 | A | * | 5/1998 | Herz et al. ..................... 725/116 |
| 5,813,863 | A | * | 9/1998 | Sloane et al. .................. 434/236 |
| 5,864,874 | A | * | 1/1999 | Shapiro .......................... 707/201 |
| 5,867,799 | A | * | 2/1999 | Lang et al. ........................... 707/1 |
| 5,918,014 | A | * | 6/1999 | Robinson ........................ 709/219 |
| 6,006,225 | A | * | 12/1999 | Bowman et al. .................... 707/5 |
| 6,012,053 | A | * | 1/2000 | Pant et al. ............................ 707/3 |
| 6,327,590 | B1 | * | 12/2001 | Chidlovskii et al. ............... 707/5 |
| 6,338,050 | B1 | * | 1/2002 | Conklin et al. ................... 705/80 |
| 6,385,619 | B1 | * | 5/2002 | Eichstaedt et al. ............ 707/748 |
| 6,493,703 | B1 | * | 12/2002 | Knight et al. ....................... 707/3 |
| 6,581,072 | B1 | * | 6/2003 | Mathur et al. ................. 707/711 |
| 6,643,681 | B1 | * | 11/2003 | Saito et al. ...................... 709/202 |
| 6,647,383 | B1 | * | 11/2003 | August et al. ....................... 707/3 |
| 6,745,178 | B1 | * | 6/2004 | Emens et al. ................... 707/741 |
| 6,839,680 | B1 | * | 1/2005 | Liu et al. ....................... 705/7.33 |
| 6,847,969 | B1 | * | 1/2005 | Mathai et al. ................. 707/100 |
| 6,947,966 | B1 | * | 9/2005 | Oko et al. ....................... 709/203 |
| 7,082,430 | B1 | * | 7/2006 | Danielsen et al. .............. 707/10 |
| 7,257,571 | B2 | * | 8/2007 | Turski et al. .......................... 1/1 |
| 7,472,110 | B2 | * | 12/2008 | Achlioptas ............................ 1/1 |
| 7,484,012 | B2 | * | 1/2009 | Hinton et al. ................. 709/250 |
| 7,499,965 | B1 | * | 3/2009 | Chai .............................. 709/202 |
| 7,730,030 | B1 | * | 6/2010 | Xu ................................. 707/617 |
| 8,375,131 | B2 | * | 2/2013 | Rogers et al. ................. 709/227 |
| 8,516,046 | B1 | * | 8/2013 | Xu ................................. 709/204 |
| 2001/0047290 | A1 | * | 11/2001 | Petras et al. ..................... 705/10 |
| 2003/0154213 | A1 | * | 8/2003 | Ahn .......................... 707/103 X |

(Continued)

OTHER PUBLICATIONS

Laxma Nandikonda, Users Should Be Concerned of Spyware in Free P2P Software, Seminar on Internetworking, 2005.*

*Primary Examiner* — Ajay Bhatia
*Assistant Examiner* — Kurt Mueller

(57) ABSTRACT

A method for creating a virtual community of users is disclosed The method includes the steps of providing a community server operable to create a virtual community based upon an action performed by a user, and rendering community services to the virtual community of users based on the action. In another aspect of the invention, a method of searching based on an action based virtual community includes the steps of providing a community server operable to create a virtual community based upon a search action performed by a user, and rendering community services to the virtual community of users based on the search action, the rendered community services including information related to returned search results and search result relevance based on other user's actions.

20 Claims, 4 Drawing Sheets

(56) References Cited

U.S. PATENT DOCUMENTS

| | | | |
|---|---|---|---|
| 2003/0186208 A1* | 10/2003 | Wen et al. | 434/350 |
| 2003/0191753 A1* | 10/2003 | Hoch | 707/3 |
| 2003/0233482 A1* | 12/2003 | Skrepetos | 709/250 |
| 2004/0172415 A1* | 9/2004 | Messina et al. | 707/104.1 |
| 2004/0193441 A1* | 9/2004 | Altieri | 705/1 |
| 2004/0205065 A1* | 10/2004 | Petras et al. | 707/5 |
| 2005/0060287 A1* | 3/2005 | Hellman et al. | 707/2 |
| 2005/0144064 A1* | 6/2005 | Calabria et al. | 705/14 |
| 2005/0144065 A1* | 6/2005 | Calabria et al. | 705/14 |
| 2005/0154693 A1* | 7/2005 | Ebert | 707/1 |
| 2005/0256866 A1* | 11/2005 | Lu et al. | 707/5 |
| 2006/0064411 A1* | 3/2006 | Gross et al. | 707/3 |
| 2006/0069616 A1* | 3/2006 | Bau | 705/14 |
| 2006/0200432 A1* | 9/2006 | Flinn et al. | 706/12 |
| 2006/0200434 A1* | 9/2006 | Flinn et al. | 706/12 |
| 2006/0206379 A1* | 9/2006 | Rosenberg | 705/14 |
| 2007/0106627 A1* | 5/2007 | Srivastava et al. | 706/20 |
| 2007/0136400 A1* | 6/2007 | Ames et al. | 707/205 |
| 2007/0150465 A1* | 6/2007 | Brave et al. | 707/5 |
| 2007/0233839 A1* | 10/2007 | Gaos | 709/223 |
| 2008/0249987 A1* | 10/2008 | Ogasawara | 707/3 |
| 2009/0055369 A1* | 2/2009 | Phillips et al. | 707/4 |
| 2009/0132918 A1* | 5/2009 | Deyo et al. | 715/705 |
| 2009/0164641 A1* | 6/2009 | Rogers et al. | 709/227 |
| 2010/0023506 A1* | 1/2010 | Sahni et al. | 707/5 |
| 2010/0268702 A1* | 10/2010 | Wissner et al. | 707/711 |
| 2011/0225511 A1* | 9/2011 | Xu | 715/753 |
| 2011/0231488 A1* | 9/2011 | Xu | 709/204 |
| 2012/0023094 A1* | 1/2012 | Messina et al. | 707/722 |
| 2012/0158715 A1* | 6/2012 | Maghoul et al. | 707/728 |
| 2013/0185422 A1* | 7/2013 | Rogers et al. | 709/224 |

* cited by examiner

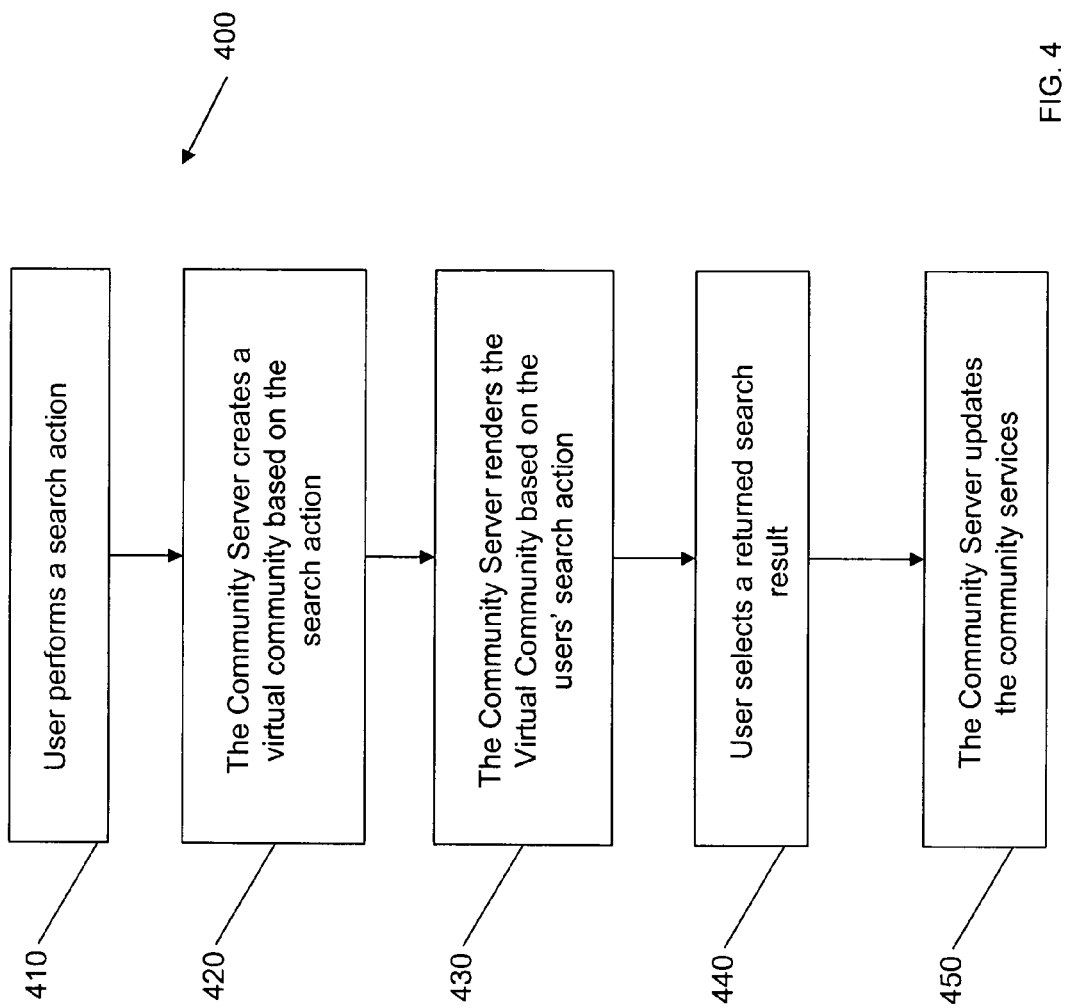

SYSTEM AND METHOD OF FORMING ACTION BASED VIRTUAL COMMUNITIES AND RELATED SEARCH MECHANISMS

CROSS REFERENCE TO RELATED APPLICATIONS

The present application claims priority under 35 U.S.C. 119(e) from provisional patent application Ser. No. 60/596,524, entitled "System and method of action-based communities and community-oriented search", filed on Sep. 30, 2005, the disclosure of which is herein incorporated by reference in its entirety.

BACKGROUND OF THE INVENTION

1. Field of the Invention

The present invention relates to online virtual communities and more particularly to a system and method of providing virtual communities based upon users' actions and behaviors and of providing a community oriented search mechanism.

2. Description of Related Art

Virtual communities based on resources that users are currently accessing connect people around the world together while they are visiting the same resource, either web site, web page, software or any other resource. A system and method of providing resource-based virtual communities are disclosed in my co-pending patent application Ser. No. 10/710,964. In the disclosed system, the user uses a regular web browser to browse the Internet and a browser plug-in or helper object will connect to the virtual community based on the resource the user is visiting. The user can connect to all other people in the world who are also visiting the same resource and can communicate or collaborate together by real-time chatting, sharing information, asking for help or exchanging ideas.

Patent application Ser. No. 10/710,964 discloses a new type of online communities—resource based virtual communities which allows any people from anywhere in the world to connect to anyone else who is also visiting the same resource together by ways of dynamically participating into the resource-based virtual communities. Automatically joining the corresponding virtual communities while accessing a resource, such as browsing the web, a user can conduct more collaborative works with others who are also using the same resource, or doing the same thing as the user.

Systems and methods of the prior suffer the problem of not being operable to group users performing a same or similar action on a network together into a community that allows the users to collaborate and interact with each other.

A publication by Yuwono et al. entitled "Search and Ranking Algorithms for Locating Resources on the World Wide Web", IEEE 1996, pp. 164-171 presents four keyword-based search and ranking algorithms for locating relevant WWW pages with respect to user queries. The first algorithm, Boolean Spreading Activation, extends the notion of word occurrence in the Boolean retrieval model by propagating the occurrence of a query word in a page to other pages linked to it. The second algorithm, most-cited, uses the number of citing hyperlinks between potentially relevant WWW pages to increase the relevance scores of the referenced pages over the referencing pages. The third algorithm, TFxIDF vector space model, is based on word distribution statistics. The last algorithm, Vector Spreading Activation, combines TFxIDF with the spreading activation model. [Para 5] The authors conducted an experiment to evaluate the retrieval effectiveness of these algorithms. The publication concerns the nature of the WWW environment with respect to document ranking strategies. However, it does not relate to any interaction between users and the backend servers.

A publication entitled "An Interactive WWW Search Engine for User-Defined Collections" (http://www.ils.unc.edu/iris, 1998) by Robert G. Sumner, Jr. et al. at School of Information and Library Science in University of North Carolina at Chapel Hill discloses the IRISWeb system. Given the dynamic nature and the quantity of information on the WWW, many individual users and organizations compile and use focused WWW resource lists related to a particular topic or subject domain. The IRISWeb system extends this concept such that any user-defined set of WWW pages (a virtual collection) can be retrieved, indexed, and searched using a powerful full-text search engine with a relevance-feedback interface. This capability adds full-text searching to highly customized subsets of the WWW.

The IRISWeb system allows users to enter a seed URL and the system collects and indexes all resources linked from the seed page. The indexing process follows links from the seed page to a depth specified by the user. A virtual collection is searchable using a WWW-based interface that relies on relevance feedback for interactive refinement of search queries. Although creating virtual collections from user-defined lists of WWW resources holds promise in a number of application domains, it is similar to traditional web crawling methods and user-interaction are limited to refining searches.

Pratyusa Manadhata and Priyank Porwal published a paper "PtoP—A Peer-to-Peer Search Engine" (April 2001). Traditional search engines are very useful tools for searching specific information in World Wide Web (WWW). But they lack the ability to index and hence search the dynamic content of the web, which is growing at a much faster rate than the static content. The information stored in the searchable databases of deep websites, which is around hundreds of times more than the static content quantitatively and 3.4 times better qualitatively, can only be searched by direct query to the database. But the process of "one at a time" direct query to different deep websites is a time consuming and laborious process. It does not disclose a peer to peer search engine that automates the process of sending queries to these deep websites using peer-to-peer technology and presents the search result from all the sites to the user. This method aims to search deep web by sending direct queries to the server's underlying searchable database using a large number of peer sites to propagate user queries.

Martin P. Courtois and Michael W. Berry in their paper "Results Ranking in Web Search Engines" (May 1999, ONLINE, at http://www.onlineinc.com/online/OL1999/courtois5.html) discussed a study test how five major search engines retrieve and rank documents in answer to sample search queries. The basic premise of relevancy searching is that results are sorted, or ranked, according to certain criteria. Criteria can include the number of terms matched, proximity of terms, location of terms within the document, frequency of terms (both within the document and within the entire database, document length, and other factors. The exact "formula" for how these criteria are applied is the "ranking algorithm" and varies among search engines. From the study, the proprietary nature of ranking algorithms makes them difficult to explore. The algorithms are under constant adjustment, both to increase their effectiveness and to prevent reverse engineering by WWW optimization firms. Still, both search engine producers and end-users would benefit from increased attention by information professionals to this important element of Web searching.

Some search engines do provide interactive features such as in the form of toolbars or search multiple sites simultaneously. Ask Jeeves (http://www.ask.com) which bought Interactive Search Holdings is one example. However, most of Interactive Search Holdings' properties are multi-search engines, offering a choice of results from five major search engines, including Google, AlltheWeb™, AltaVista™, Ask Jeeves™ or LookSmart™. Google™ is the default provider of search results for all of Interactive Search Holdings' destination sites other than Excite™, which is powered by metasearch provider InfoSpace™ So on the searching software, essentially there is not much difference from other traditional search engine.

Weifeng Zhang et al from Department of Computer Science and Engineering, Southeast University, China in paper "Development of a Self-adaptive Web Search Engine" (November 2001, WSE2001 Florence, Italy, p 86-93) talk about a self-adaptive system provided with feedback ability. As current web search engines produce search results related with the search terms and the actual information collected by them, the selections of the search results cannot affect the future ones, so they cannot cover most people's interests. In this paper, feedback signals produced by the users' accessing lists can influence the search results. And thus the search engines can provide self-adaptability. This paper proposed a self-adaptive search engine (ASE) that is made up of the feedback information collecting and producing agent, the feedback repository, the search results adjuster (the agent to adjust the search results) and the pre-search engine.

The feedback information collecting and producing agent records the information about the users' choices among the search results and the processed results are stored in the feedback information repository. According to the users' query requests, the pre-search engine in the ASE can search the corresponding information from the index database and then send to the search result adjuster in some format, which mainly takes charge of the integration of the last search results. Although it considers user feedback as an input, it does not return all the user's choices back to the querying users to help new users to decide their choices.

Yoshinori Hijikata of Osaka University, Osaka, Japan presented a paper "Implicit user profiling for on demand relevance feedback" (2004, International Conference on Intelligent User Interfaces, Funchal, Madeira, Portugal, p 198-205) about relevance feedback which searches similar documents based on the documents browsed by the user. If the user wants to conduct relevance feedback on demand, which means the user wants to see similar documents while reading a document, the existing user profiling techniques cannot acquire keywords in high precision that the user is interested in at such a short time. This paper proposes a method for extracting text parts which the user might be interested in from the whole text of the Web page based on the user's mouse operation in the Web browser.

The objective of this research is to (1) find what kind of mouse operation represent users' interests, (2) see the effectiveness of the found mouse operation in selecting keywords, and (3) compare our method with tf-idf, which is the most fundamental method used in many user profiling systems. From the user experiment, the precision to select keywords of our method is about 1.4 times compared with that of tf-idf. This paper is mainly about methods to detect user interests based on mouse movement and does not cover how collective users in the web can collaborate information to share search results.

The shopping search of InStore™ (www.in-store.com) and the later Google™'s suggestion method (http://www.google.com/webhp?complete=1) is another interactive method utilizing XMLHttpRequest in the browser to send user feedback instantly about matching numbers while users are still typing keywords in the input box. This method solely provides interactively between one user and servers and does not include collaboration efforts among other users.

Many database systems support query or search capabilities and some support interactive searches. One example is the Domino Notes™ application (http://www-128.ibm.com/developerworks/lotus/library/appstrat-search/2/2004) from IBMT™. On one hand, the notes application allows users to enter more keywords or add more options step by step. On the other hand, the interactive search support allows users to define key words, questions and answers as they are adding documents. To enable keyword searching, the document author adds one or more relevant words in the Keywords field. The Keywords field allows multiple values and allows values not in the list, so document authors can add new values as needed. As more and more documents are given keywords, the richness of searching by keyword increases.

U.S. Pat. No. 6,799,176 (Sep. 28, 2004; 707/5) to Page et al. entitled "Method for scoring documents in a linked database" discloses a method for scoring documents stored in a network. The method includes identifying links from linking documents to linked documents in the network and determining an importance of the identified links. The method further includes weighting the identified links based on the determined importance and scoring the linked documents based on the weighted links. This disclosure is focused on the static analysis of the links among documents.

U.S. Pat. No. 6,278,992 to Curtis et al. entitled "Search engine using indexing method for storing and retrieving data" discloses a Search Engine utilizing a method and system for efficient storage and retrieval of data. The system comprises a record file, an index file, a duplicate segment file and access to a network of computers. The index files contain locations of data items, pointers to other index files, or an empty designation. The index files are arrays that contain locations corresponding to a predetermined range of characters with which the data items may be formed. Data items are stored according to the character strings of each data item. The first portion of a data object is indexed according to the indexing method of the present invention while a second portion of the data object is indexed according to another known database technology, such as B-tree. This disclosure is about how to organize, store and retrieve data files.

U.S. Pat. No. 6,845,374 to Oliver, et al. entitled "System and method for adaptive text recommendation" discloses a network system that provides a real-time adaptive recommendation set of documents with a high statistical measure of relevancy to the requestor device. The recommendation set is optimized based on analyzing text of documents of the interest set, categorizing these documents into clusters, extracting keywords representing the themes or concepts of documents in the clusters, and filtering a population of eligible documents accessible to the system utilizing site and or Internet-wide search engines. The system is either automatically or manually invoked and it develops and presents the recommendation set in real-time. The recommendation set may be presented as a greeting, notification, alert, HTML fragment, fax, voicemail, or automatic classification or routing of customer e-mail, personal e-mail, job postings, and offers for sale or exchange. This disclosure talks about the adaptive recommendation set, but does not cover its usage on search engines.

U.S. Pat. No. 6,766,316 to Caudill, et al, (Jul. 20, 2004, 707/3;) titled "Method and system of ranking and clustering for document indexing and retrieval" discussed about a relevancy ranking and clustering method and system that determines the relevance of a document relative to a user's query using a similarity comparison process. Input queries are parsed into one or more query predicate structures using an ontological parser. The ontological parser parses a set of known documents to generate one or more document predicate structures. A comparison of each query predicate structure with each document predicate structure is performed to determine a matching degree, represented by a real number. A multilevel modifier strategy is implemented to assign different relevance values to the different parts of each predicate structure match to calculate the predicate structure's matching degree.

In this disclosure, the relevance of a document to a user's query is determined by calculating a similarity coefficient, based on the structures of each pair of query predicates and document predicates. Documents are autonomously clustered using a self-organizing neural network that provides a coordinate system that makes judgments in a non-subjective fashion. This system and method is still an addition to the traditional ranking method.

U.S. Pat. No. 6,842,748 to Warner et al. entitled "Usage based strength between related information in an information retrieval system" discloses an information retrieval system that maintains a database that defines a relational association between a plurality of informational items in the system. The relational association is based on historical navigational behavior of users of the information retrieval system, and includes a relationship type, which is based on the characteristic similarities between the informational items, and relationship strength, which is based on the historical frequency of any related informational items being selected by a user within the same information retrieval session. When navigation from one informational item to another information item is detected, the relationship type and the relationship strength of the two informational items are determined and stored in the database. During a subsequent selection of an informational item, any related informational items related to the selected informational item are sorted based on the respective relationship types and relationship strengths, and are provided in a sorted list from which the user can select. This disclosure is mainly about the relational association but not the method of utilizing that kind of information.

U.S. Pat. No. 6,704,729 to Klein et al. entitled "Retrieval of relevant information categories" relates to large stores of information that are often organized in a hierarchical taxonomy to aid a search and retrieval of the information. The hierarchical taxonomy generally consists of related categories of information, called "nodes," that each may contain information relevant to the search. Each node is addressable according to its path in the hierarchical taxonomy. In information stores where the number of nodes having relevant information is extremely large, such as the Internet, providing a cohesive, intelligent, and organized display of the search results becomes extremely important to the success of a user traversing the store to find relevant information. The invention provides such search results by ranking each node of the taxonomy to determine which nodes are most likely to be relevant to the search request. The invention then creates a conceptually-related "cluster" of nodes by selecting a relevant "seed" node and relevant nodes related to the "seed" node.

U.S. Pat. No. 6,718,324 to Edlund et al. entitled "Metadata search results ranking system" utilizes a combination of popularity and/or relevancy to determine a search ranking for a given search result association. Given the exponential growth rate currently being experienced in the Internet community, the present invention provides one of the few methods by which searches of this vast distributed database can produce useful results ranked and sorted by usefulness to the searching web surfer. The present invention permits embodiments incorporating a Ranking System/Method (0100) further comprising a Session Manager (0101), Query Manager (0102), Popularity Sorter (0103), and Association (0104) functions. These components may be augmented in some preferred embodiments via the use of a Query Entry means (0155), Search Engine (0156); Data Repository (0157), Query Database (0158), and/or a Resource List (0159). That invention examines the user's behavior by monitoring all the hyperlinks the user clicks on and stores the association information in a database system. It requires quite complex external components and also does not mention real time interactivity among users.

U.S. Pat. No. 6,675,159 to Lin et al. (Jan. 6, 2004, 707/3;) titled "Concept-based search and retrieval system" talks about a concept-based indexing and search system indexes collections of documents with ontology-based predicate structures through automated and/or human-assisted methods. The system extracts the concepts behind user queries to return only those documents that match those concepts. The concept based search and retrieval system comprehends the intent behind a query from a user, and returns results matching that intent. The system can perform off-line searches for unanswered user queries and notify the user when a match is found. Mainly this patent discussed the way to extract concepts behind user queries.

U.S. Pat. No. 6,665,655 to Warner et al. entitled "Implicit rating of retrieved information in an information search system" discloses an information retrieval system that allows a user to search a database of informational items for a desired informational item, and presents the search result in the form of matching index entries in the order of relevance. The information retrieval system in accordance with the principles of the present invention assigns a relevance rating to each of the index entries without requiring an explicit input from the user with respect to the usefulness or the relevance of the retrieved information corresponding to the respective index entries. When the user selects and retrieves an informational item through a list of index entries presented by the retrieval system, as a result of a search, the relevance rating of the selected informational item is increased by a predetermined amount. The relevance rating of the selected informational item is further adjusted based on any actions the user takes subsequent to the initial selection of the informational item if the subsequent act indicates that the relevance of the selected informational item may be less than what is reflected by the rating increase by the predetermined amount.

Ratings of the informational items in the database are determined from implicit suggestions from the usage of the retrieval system and the database by the user rather than from an explicit user input. In another aspect of the present invention, the ratings are allowed to decay over time to minimize the tendencies for historical usage biased rating, and to provide more temporally accurate ratings. The most recently accessed time of each of the informational items in the database is compared to a predetermined stale access time threshold, and if the most recently accessed time is older than the threshold, than the rating of the corresponding informational item is decreased to reflect the dated nature of the information contained within the item.

In 1999, Bamshad Mobasher of DePaul University et al., published an article entitled "Creating adaptive Web sites through usage-based clustering of URLs", in Knowledge and Data Engineering Exchange, 1999. (KDEX '99). In this paper they describe an approach to usage-based Web personalization taking into account both the offline tasks related to the mining of usage data, and the online process of automatic Web page customization based on the mined knowledge. Specifically, they propose an effective technique for capturing common user profiles based on association-rule discovery and usage-based clustering. They also propose techniques for combining this knowledge with the current status of an ongoing Web activity to perform real-time personalization. Finally, they provide an experimental evaluation of the proposed techniques using real Web usage data. This paper also describes a usage based approach, and does not specify how the approach is applied for searching process.

In Jan. 29, 1998, Page et al. from Stanford Digital Library Technologies Project describes page rank in the paper "The PageRank citation Ranking: Bringing Order to the Web". (Online., pp. 1-17). This paper describes PageRank, a method for rating Web pages objectively and mechanically, effectively measuring the human interest and attention devoted to them. They compare PageRank to an idealized random Web surfer. They also show how to efficiently compute PageRank. This paper is focus on the objective properties of web pages and does not consider user interactions with web pages.

U.S. Pat. No. 6,584,471 to Maclin et al. entitled "System and method for the adaptive, hierarchical receipt, ranking, organization and display of information based upon democratic criteria and resultant dynamic profiling" discloses a system and method for receiving, organizing and displaying information received from a plurality of users, having a hierarchical database with at least one expandable level, at least one of the at least one expandable levels having at least two expandable sublevels; an interactive interface for placing each user at a level and sublevel in the database, receiving user-supplied information for modification and addition to the content and structure of the levels and sublevels of the database, receiving user-supplied commands for navigating through and extracting content from the database, presenting content from the database in accordance with the information and commands supplied; a counting routine which increments a level and sublevel specific counter each time a user is placed at a level and sublevel within the at least two expandable levels and sublevels; and a database sorting function for gathering the plurality of user-supplied information and commands virtually simultaneously, and updating the hierarchical structure of the database in accordance with the magnitude of the number of the specific counter.

The database levels and sublevels are categories, subcategories and query items. The commands are search, add, select and interact. Additionally shown is a data base search engine for receiving database search commands from at least one user, searching the database for matches, and presenting the results of the search. The system dynamically profiles members of an on-line community in that it allows a member to see those who have answered query items in a subcategory and category in a manner suggestive of some desired similarity in character. This invention focuses on the profiling aspect of an online community.

U.S. Pat. No. 6,546,388 to Edlund et al. entitled "Metadata search results ranking system" is about a method for presenting to an end-user the intermediate matching search results of a keyword search in an index list of information. The method comprising the steps of: coupling to a search engine a graphical user interface for accepting keyword search terms for searching the indexed list of information with the search engine; receiving one or more keyword search terms with one or more separation characters separating there between; performing a keyword search with the one or more keyword search terms received when a separation character is received; and presenting the number of documents matching the keyword search terms to the end-user presenting a graphical menu item on a display. This patent discloses a system and method of metadata search ranking and utilizes a combination of popularity and/or relevancy to determine a search ranking for a given search result association. Its focus is metadata search and provides no interactivity among users or search engine.

U.S. Pat. No. 6,523,037 to Monahan et al. entitled "Method and system for communicating selected search results between first and second entities over a network" discloses a system and method in which a search result set is communicated to a first user as hypertext descriptions of data items constituting the result search set. A check box is displayed adjacent each hypertext description, utilizing which the first user may select a subset of the search result set. This subset is then communicated to a second user, again as hypertext descriptions of the subset. Check boxes are furthermore displayed to the second user so as to enable the second user to select a further and narrower subset of the search result set. Selected items of a result set of an Internet-based search may in this way conveniently be communicated between first and second users. Each of a number of interfaces provides the hypertext descriptions of the data items of the search result set. This disclosure does not cover group user's interactions.

U.S. Pat. No. 6,397,212 to Biffar entitled "Self-learning and self-personalizing knowledge search engine that delivers holistic results" discloses a search engine that provides intelligent multi-dimensional searches, in which the search engine always presents a complete, holistic result, and in which the search engine presents knowledge (i.e. linked facts) and not just information (i.e. facts). The search engine is adaptive, such that the search results improve over time as the system learns about the user and develops a user profile. Thus, the search engine is self personalizing, i.e. it collects and analyzes the user history, and/or it has the user react to solutions and learns from such user reactions.

The search engine generates profiles, e.g. it learns from all searches of all users and combines the user profiles and patterns of similar users. The search engine accepts direct user feedback to improve the next search iteration. One feature of the invention is locking/unlocking, where a user may select specific attributes that are to remain locked while the search engine matches these locked attributes to all unlocked attributes. This patent also does not mention real time characteristics.

U.S. Pat. No. 6,370,526 by Agrawal et al. entitled "Self-adaptive method and system for providing a user-preferred ranking order of object sets" discloses a system and method in which objects are ranked according to user preferences by first observing the access order of a related group of objects in relation to a predetermined access hypothesis. A user preference model is then adapted to correspond to any deviations between the access order and the access hypothesis for the related group of objects. Next, object preferences are calculated for each of the objects to be ranked according to the preference model. The group of objects is then presented to the user in an order corresponding to the calculated object preferences. In this patent, the preference model is adaptively updated, unbeknownst to the user, in the normal course of accessing the presented objects. This patent does not cover interactivity among users.

U.S. Pat. No. 6,314,420 to Lang et al. entitled "Collaborative/adaptive search engine" discloses a portal site on the internet. The search engine system employs a regular search engine to make one-shot or demand searches for information entities which provide at least threshold matches to user queries. The search engine system also employs a collaborative/content-based filter to make continuing searches for information entities which match existing wire queries and are ranked and stored over time in user-accessible, system wires corresponding to the respective queries. In this patent, a user feedback system provides collaborative feedback data for integration with content profile data in the operation of the collaborative/content-based filter. A query processor determines whether a demand search or a wire search is made for an input query. This patent does not cover group or real time communications.

U.S. Pat. No. 6,282,534 to Vora entitled "Reverse content indexing" discloses a method for generating knowledge base entries by using a programmed computer with access to said knowledge base is disclosed. In one embodiment, after information is collected from content providers, the present invention attempts to generate questions which relate to the collected information. Such questions are presented to a non-expert user in view of received information. If the information does not answer the generated questions, the user modifies the questions so that the information becomes the solutions to them. Then these questions and solutions pairs are entered into the knowledge base. This patent does not cover collaborative relationship between users and search engines.

U.S. Pat. No. 6,266,668 to Vanderveldt et al. entitled "System and method for dynamic data-mining and on-line communication of customized information" discloses a method and system for dynamically searching databases in response to a query is provided by the present invention. More specifically, a system and method for dynamic data-mining and on-line communication of customized information. This method includes the steps of first creating a search-specific profile. This search-specific profile is then input into a data-mining search engine. The data-mining search engine will mine the search-specific profile to determine topic of interests. These topics of interest are output to at least one search tool. These search tools match the topics of interest to at least one destination data site wherein the destination data sites are evaluated to determine if relevant information is present in the destination data site. Relevant information is filtered and presented to the user making the inquiry.

US Patent Application Publication No. 20050071328 to Lawrence, Stephen R. entitled "Personalization of web search" discloses a system and method for creating a user profile and for using the user profile to order search results returned by a search engine. The user profile is based on search queries submitted by a user, the user's specific interaction with the documents identified by the search engine and personal information provided by the user. Generic scores associated with the search results are modulated by the user profile to measure their relevance to a user's preference and interest. The search results are re-ordered accordingly so that the most relevant results appear on the top of the list. User profiles can be created and/or stored on the client side or server side of a client-server network environment. This patent application uses user profile as a way to influence the search result but does not contain interactions.

United States Patent Application No. 20040260688 to Gross entitled "Method for implementing search engine" discloses a system and method for implementing/influencing a search engine which provides search results to users based on characteristics of certain trendsetter web pages identified on the Internet. The trendsetter web pages are determined by studying historical adoption behavior of a group within the universe of websites, or by reference to known indicia. This application does not cover real-time interactions as well.

United States Patent Application Publication No. 20030158839 to Faybishenko et al. entitled "System and method for determining relevancy of query responses in a distributed network search mechanism" discloses a system and method for selecting or ordering search results received from members of a distributing search network in response to a search request. Network nodes operating as consumer or requesting nodes generate the search requests. Nodes operating as hubs are configured to route the search requests in the network. Individual nodes operating as provider nodes receive the search request and in response may generate results according to their own procedures and return them.

Communication between nodes in the network may use a common query protocol. Hub nodes may resolve the search requests to a subset of the provider nodes in the network, for example by matching search requests with registration information from nodes. Search results may be selected, ordered, and/or consolidated for use by the requesting nodes by nodes receiving a plurality of the search results. This is more like a peer to peer approach to search engines.

US Patent Application Publication No. 20010047290 to Petras et al. entitled "System for creating and maintaining a database of information utilizing user opinions" discloses a system for automatically creating and maintaining a database of information utilizing user opinions about subjects, particularly exceptional experiences. Described is an Internet system assisting/motivating a population of users interested in information about certain categories of subjects to automatically maintain the database content and to improve the usefulness and quality of the database information without any substantial management by the website owner-manager. The user opinions are primarily in the form of both comments and ratings about which natural-language terms best describe a particular subject, enabling user searches of the subject database to be by way of preferred such descriptive natural-language terms, which terms are further preferred to be evaluative and approving. The disclosed system also utilizes user opinions for database information but the interactivity between users and their communities are unclear.

SUMMARY OF THE INVENTION

In order to enable users to get better satisfaction from collaboration in virtual communities, what is needed then is a system and method that allows virtual community users to collaborate not only on the resource they are visiting, browsing to, or accessing but on the actions they are performing or behaviors they are engaged in on the Internet. What is also needed is a system and method that allows all users who are performing the same action or doing the same thing in the Internet to be automatically grouped, organized and participated in a virtual community based on the action or actions the users are performing, such as the query they are sending. What is further needed is a system and method that allows users to discover and connect to other users, share information with them, ask questions, comment on the operation and do anything they want.

The present disclosure solves the problems of the prior art by providing a new method that enables virtual community users to collaborate not only on the resource they are visiting or accessing but on the actions they are performing or behaviors they are engaged in on the Internet. Similar to the resource based virtual communities, all users who are performing the same action or doing the same thing in the Internet are automatically grouped, organized and participated in a virtual community based on the actions they performing, such as the user sending a query over a network. Being part of the virtual community, each user can discover and connect to other users, share information with them, ask questions, comment on the operation and do anything they want. Furthermore, a new type of search mechanism based on the action based virtual communities that comprises all current users for any particular queries is disclosed.

In accordance with an aspect of the invention, a method for creating a virtual community of users includes the steps of providing a community server operable to create a virtual community based upon an action performed by a user, and rendering community services to the virtual community of users based on the action.

In accordance with another aspect of the invention, a method of searching includes the steps of providing a community server operable to create a virtual community based upon a search action performed by a user and rendering community services to the virtual community of users based on the search action, the rendered community services including information related to search results.

In accordance with yet another aspect of the invention, a system of providing an action based virtual community includes a community server operable to manage a plurality of action based virtual communities associated with each of a plurality of user actions, ones of the plurality of users becoming community members of the action based virtual community associated with the user's action.

In accordance with another aspect of the invention, a method of searching based on an action based virtual community includes the steps of providing a community server operable to create a virtual community based upon a search action performed by a user, and rendering community services to the virtual community of users based on the search action, the rendered community services including information related to returned search results and search result relevance based on other user's actions.

There has been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended herein.

In this respect, before explaining at least one embodiment of the invention in detail, it is to be understood that the invention is not limited in its application to the details of functional components and to the arrangements of these components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIG. 4 is a schematic representation for the method of performing a collaborative search within a virtual community based on user actions.

DETAILED DESCRIPTION

Patent application Ser. No. 10/710,964, filed on Aug. 15, 2004, and entitled "Resource-based Virtual Communities", discloses a new type of online communities—resource based virtual communities, in addition, provisional patent application Ser. No. 60/596,493 filed on Sep. 28, 2005, and entitled "System and Method of Grouping Resource-Based Communities", describes methods to group resource based virtual communities so that all users using resources from the same topic, subject or even keywords or other imaginary concept can also form communities. For example, all users using or browsing web pages that contain same key words can join the same virtual communities composing of those key words The present invention will now be described in detail with reference to the drawings, which are provided as illustrative examples of the invention so as to enable those skilled in the art to practice the invention. Notably, the figures and examples below are not meant to limit the scope of the present invention. Where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the components referred to herein by way of illustration.

Most users use the Internet to access online resources such as browsing to a website. Some other users are using the Internet for performing certain tasks, such as searching for items, looking for products or answers to questions. Yet some others play games or read news from other sources such as RSS sites. Meanwhile, resources that users are accessing can provide more dynamic services and contents than static web pages, such as listing of product catalogs, or allowing users to engage in transactions online and so on. The above-referenced patent applications disclose virtual communities based on resources in the Internet. The present disclosure addresses virtual communities based on users' behaviors or actions in the Internet.

For example, if a web site provides search capabilities for users through the same web page, in the view of resource based virtual communities, all users accessing the web page are still in the same virtual communities, regardless what kind of search the user is performing. Or, another example is that if one web page (which contains one unique URL) provides many services and uses cookies or other hidden form entries to identify those service and user selections, in that case, although people are performing all different operations, the virtual communities remain the same, in another words, the prior art virtual communities do reflect those kind of dynamical web behaviors.

Figure 1:
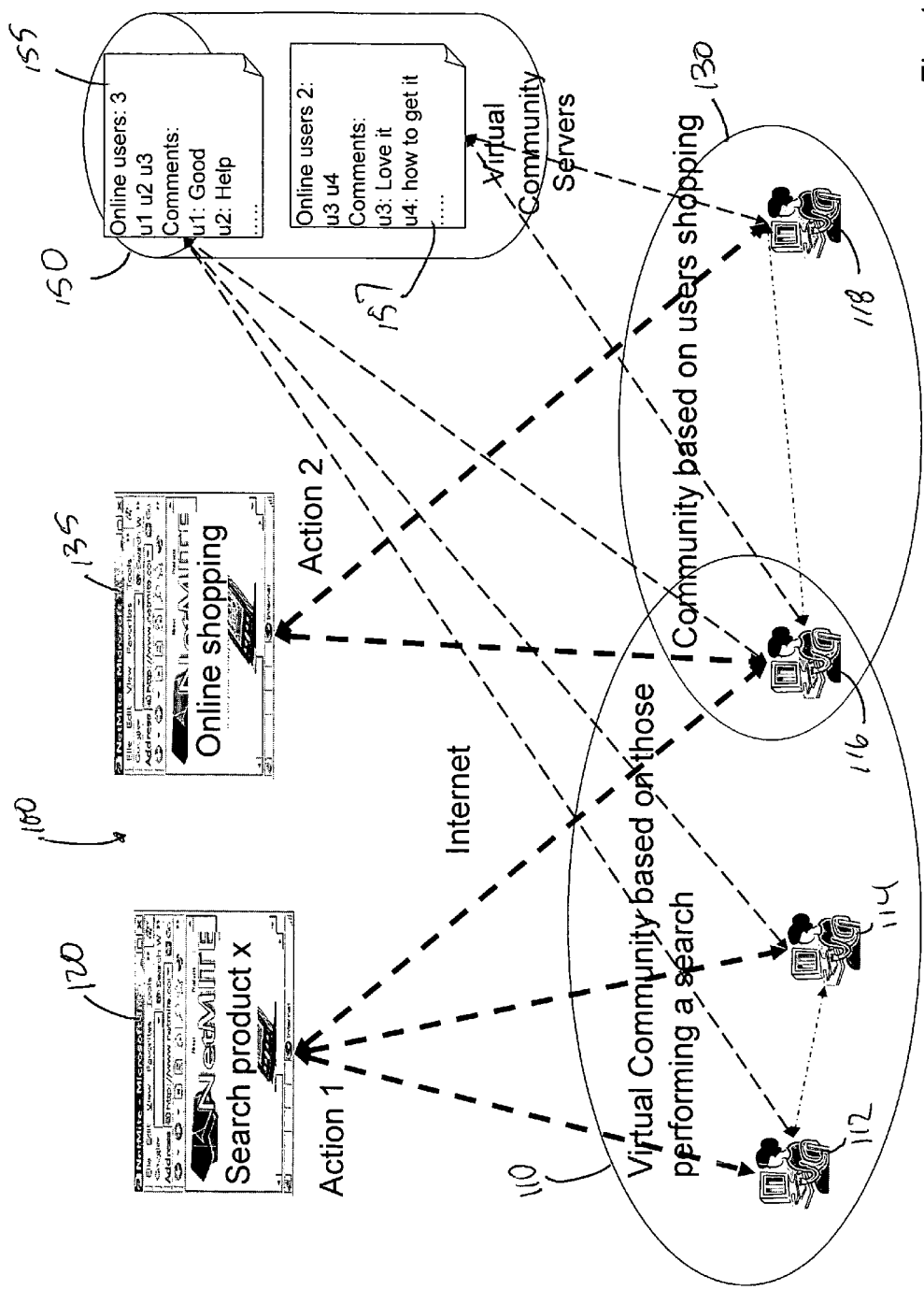
FIG. 1 is a schematic showing an overview of action based virtual communities.

A system generally designated 100 in accordance with the invention supports those kinds of virtual communities as shown in FIG. 1. A first virtual community 110 is formed in a virtual community server 150 based on a first action 120, search for product x. Users 112, 114 and 116 form the first virtual community 110. A second virtual community 130 is formed in the virtual community server 150 based on a second action 135, including online shopping. The second virtual community 130 is comprised of user 116 and user 118. The virtual community server 150 is operable to server community services 155 to the first virtual community 110 and services 157 to the second virtual community 130.

Figure 3:
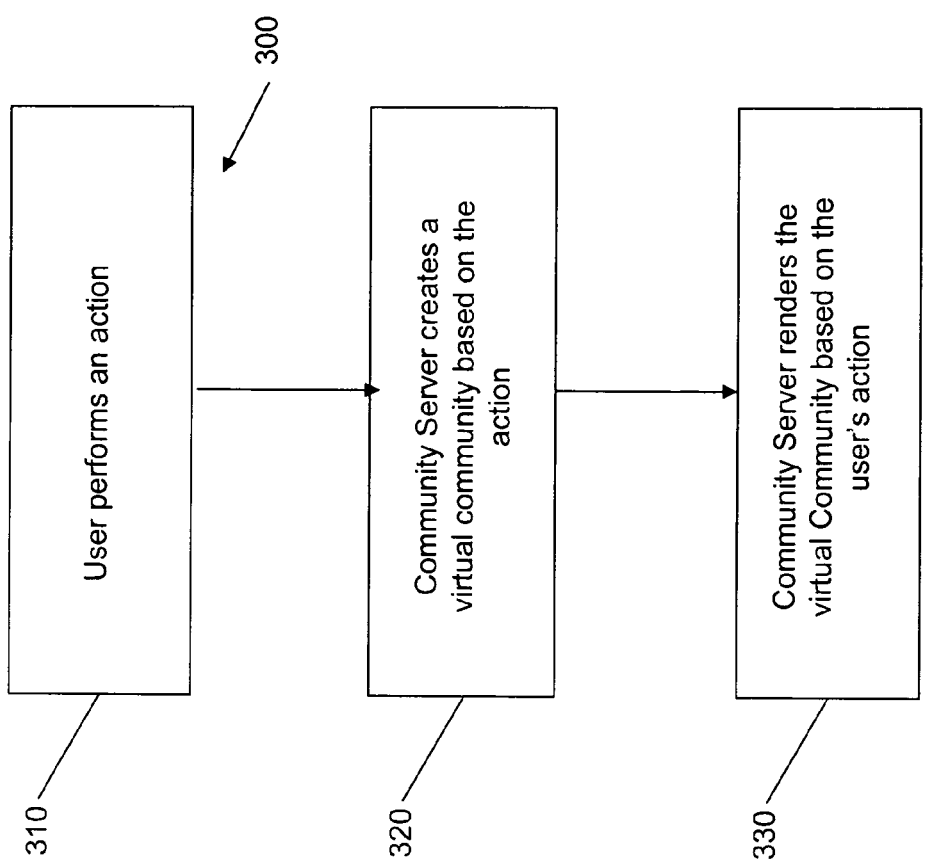
FIG. 3 is a schematic representation for the method of providing a virtual community based on user actions.

A method generally designated 300 of providing a virtual community based on a user's action or behavior is shown in FIG. 3. In a step 310 a user performs an action and the action is captured by a community server or a plug-in or helper object installed on the user's machine. In a step 320, the community server creates a virtual community based on the user's action. The community server or the plug-in or helper object renders the virtual community based on the user's action in a step 330. The rendering includes serving a community home page including community services such as community statistics and collaboration services.

Instead of looking at the resources users are accessing in the resource based communities, action based virtual communities look at users' actions or behaviors. Users' actions include, but are not limited to, searching items, asking questions, filling in forms, submitting requests, looking for products and purchasing products. The action based communities comprise of users who are performing the same actions in the Internet. They could share ideas, communicate to each other, ask for help or conduct any other collaboration. They normally have more stuff in common—maybe they are looking for similar products, working in similar fields, or sharing similar interests and are much easier to get familiar with each other.

For example, when a student is working on a paper about computational physics and he is searching items on that, another student from another country might be searching the same items. If they have same or similar queries, most likely they have similar background knowledge and can share some ideas, and at the minimum they know something together. Another example is that if somebody is shopping for a paint product, he might be remodeling his house and it is very helpful for him to speak to another person who is also looking for the same paints—and they can either share opinions about a particular paint product and may even share opinions about remodeling work.

This process is similar to the resource based virtual communities and the main difference is that now it is the action users perform or the user's behavior that determine which virtual communities the user is connected to at the moment. The action-based communities can avail themselves of the resource based virtual community servers to setup the virtual communities and provide the same virtual community services such as chatting, messaging, comments, voting.

In additional, many types of businesses, such as advertising, online auctions can also run inside the communities, for example, posting advertisements to the related keywords or user behaviors, enabling transactions, bid and auctions to all members of the communities. This is a different business model than those proposed in the prior art since although most existing business models in current Internet also send content-related advertisement to the users, they are still based the web page the user is visiting. Say, when the user is visiting a stock page, then the server will send stock related advertisements such as financial management company advertisements. Some companies like Google™ send related advertisement according to a user's keyword in their search results.

However, none of the prior art systems or methods can send targeted advertisement to the user as a community, such as sending same or similar advertisements to all users who are accessing the same resource, performing the same action or shown similar behaviors while they are surfing all resource and services in Internet. This is accomplished in the disclosed resource and action based communities because the server can serve targeted advertisements based on the behavior of the user or community. For example, when some people are visiting cancer web sites, the virtual community server can send advertisements on a new medication for cancer. When people are shopping for sports suits, the server is operable to server sports utility advertisements. This is not limited to a single web site.

Inside the action based virtual communities, the system may also assign a unique URL for those different actions. For example, one way is to use different URL protocols for different actions like search://keywords=word1+word2 or ask://question=my question. Also a user's id can also be shared for users in either type of communities. With each action given a unique URL the system can reuse resource based virtual communities to provide supports to the action-based communities.

Of course, all the different methods to provide or implement resource based communities also apply here with no or little modification. For example, to provide support through the browser plug-in or helper object, the browser plug-in adds support of recognizing user actions or behaviors performed by users, such as querying, searching, shopping and then transforms those actions to the unique action based URL and sends back the URL to the community servers which are responsible for collecting all users performing the same actions. The community servers return information about the current communities back to the browser plug-in which will render the information to the users to see others in the community.

Similar to the resource based virtual communities, members in this action based communities have multiple membership in each community corresponding to the action he just performed. Every time he is performing a different action, he may connect to the community to the other action. He has the option to disconnect to that community after he stops that action, or stay connected to that community if he chooses so. However, regardless when he disconnect to that community, the virtual communities may also allow users to leave his access or contact information in the whole community system so others who are performing the same action can connect to and communicate to him later. In addition, the whole communities which are consisting of all users who have performed the same actions in the past, are performing the same actions now and those who will perform the same actions in the future. This allows users to communicate to each other regardless when and how long he has spent for the action or stayed in the community.

Similar to the resource based virtual community, action based virtual community can be organized to interact with another action based virtual community by means of grouping several communities together or allowing any users to talk across communities based on keywords, categories or any other criteria, some of which may be imaginary and not concrete. For example, a user shopping for an electronic fan may be grouped together with another one who shops only for paper fans since their action was looking for products in the same fans category.

Of course all users should be allowed to configure whether they want to automatically connect to the grouped communities which consists of more people who are doing the similar action or just stay tuned in the ungrouped community with those who are performing exactly the same action—may be somebody will only interest in talking with others who are searching electronic fan, not paper fans. Also users from action based virtual communities to communicate with users from resource based virtual communities—for example, one user who queried about computer technologies may be able to communicate to users who are accessing web resources which are categorized as computer technologies. Furthermore, users in action based communities could even communicate with users in traditional communities such as online forums, discussion groups, instant messengers, bulletin boards utilizing the same methods and procedures as described in patent application 60/596,493.

One difficult task for the browser plug-in or helper object is how to distinguish or detect the user action he is performing while he is online. This is especially important while the user is also performing web surfing and accessing web resources and thus also part of resource based virtual communities. There are a couple of ways to perform the detection, and either one can be used individually or combined together. Once the plug-in or helper object detects the actual action a user is performing, for example, searching for description of a phenomenon or shopping for a particular product, it can connect the user to the corresponding virtual community based on that action.

The first way is to monitor the users' action in the computer or in the browser such as the program the user is used most frequently, searching menu the user selected from Internet Explorer or Netscape. In addition, the system, or plug-in or helper object can even trace and analyze the user's many actions while he is using the computer or on line behavior to classifying, organize or category the current behavior he is using, it may also find what the user's real interests is. For example, when the user spent lots of time on PhotoShop, his action is painting and designing graphics and a user searching for paintings may be an artist.

Another way is to follow web sites visited by users that providing such services, such as searching or shopping. For example, most querying or searching in the web is provided by Google™, Yahoo™ or MSN which have well known URLs. While users go to those sites, the actions will be the keywords he entered in the search field. The action of a person who visits eBay™ is most likely online bidding and auction.

A third way is to examine the communication protocol user used to communicate with the server to retrieve his action or behaviors, for instance, HTTP POST data or URL parameters sent out to some web servers such as many e-commence sites or online shops. Since many popular Internet service companies uses standard protocols for communication between clients and servers, such information is also quite easy to get and retrieve since they represent the users request in most cases. And we can use the same information users sent in their request to determine what kind of services or actions the users are performing. This method does not matter if the communication is secure communication or not since the plug-in or helper object is in the client side.

Of course, all the grabbing, intercepting, retrieving or analyzing of user's action should be understood, granted and monitored under users' permission. No confidential information shall be released to the outside world including other community members. The whole purpose of the action based virtual communities is to allow users performing same or similar actions can connect, communicate, share and help each other. User's privacy shall be strictly protected in that no one else is allowed to view one user's personal data or information without permission.

In both resource and action based communities, it is also possible to join, divide or filter communities based on multiple resources or actions. In this scenario, a new joint community could be setup composing those users who have accessed or are accessing multiple resources in the past or at present. This can be useful if there are too many members accessing in one very popular resource—breaking down to adding more criteria may reduce the number of users. It can also be helpful to match any persons in the world that have more similarity in their interests or behaviors—it two person have accessed many same or similar resources, or performed same or similar actions, it is more likely they have many things in common.

For example, one resource based community could be based on all users accessing the resource of the solar power system and another community is based on all users accessing the resource of the wind power system, then the community composing of those who accessed both solar and wind power system may care more about environment protection.

During this join, matching or filtering process, sometimes the order may be a factor for determining membership. For example, a person who shops first and then donate next may not as generous as a person who makes donation before shopping. Of course, in order to detect the order of actions or resource accessed may not be an issue in the majority case but can be applicable for some special use cases. Sometimes, these two kinds of communities can also be mixed together, for instance, those who did search first for an item and then access an items returned by the search engine.

In addition, this joining, matching or filtering process could be done either by the virtual community system, system servers, or by each user individually. When done individually, a person can setup his own filter to filter out those people in the communities he connects to and can find those who match his criteria. Of course, filtering and matching should only be done with permissions for those willing to be matched. Security is always a consideration since some people may not want their actions or accessed resources to be filtered or matched with others.

With the action and resource based virtual communities, a new search method is possible which is based on the communities around those who are performing the same or similar queries and using the query results, either real time or not. It allows users to share their knowledge, experience and results during the process of searching and collaborate each other either explicitly or implicitly.

As Internet becomes the largest information repository and continues to grow at very high speed, the sheer volume of information available makes searching for specific information quite a daunting task. Search engines are efficient tools for finding relevant information in the rapidly growing and highly dynamic web. There are quite a number of search engines available today such as Google™, Yahoo™, InfoSeek™ or MSNT™.

Typically, every search engine consists of three major components: crawler, indexed repository and search software. The web crawler fetches web pages (or documents) in a recursive manner according to a predefined importance metric for web pages. Some example metrics are back link count of the page, forward link count, location, page rank etc. The Indexer parses these pages to build an inverted index that is then used by the search software to return relevant documents for a user query. When the user visits the home page of those search engines and enters keywords, it is the search software's job to retrieve the relevant document from the indexed database. Sometimes, if the user's selection catches too many matches, the engine allows user to enter additional keywords to further refine the matched items.

However, this process has a draw back that is: the highest ranked items matched by the search software which are listed on top and present to users first, may not be the one that user really wants. Various methods have been disclosed, discussed and used to identify the matrix of the web pages to match user's search criteria through many technical measurements.

Many search engines support boolean operators, field searching, and other advanced techniques, but with relevancy searching users simply enter their terms and click the search button. While search engines may retrieve thousands of hits, its producers claim their systems place items that best match the search query at the top of the results list.

The basic premise of relevancy searching is that results are sorted, or ranked, according to certain criteria. Criteria can include the number of terms matched, proximity of terms, location of terms within the document, frequency of terms (both within the document and within the entire database, document length, and other factors. The exact "formula" for how these criteria are applied is the "ranking algorithm" and varies among search engines.

In the field of information technology, search is one of the most frequently used actions to find information. Various search algorithms and methods have been proposed since computer is invented. Many other search methods have also been proposed and used since Internet became popular that allows anyone who has connection to the Internet can do search with remote database and web servers. However, the importance of a Web page is an inherently subjective which depends on the readers' interests, knowledge and attitude.

In other words, it is people who have the final answer as whether the relevance is valid or useful or not, even some search results have very high ranks with respect to the relevance rankings, people, or the query starter may not think that he has found the answers he is looking for. This is partly due to that most of the searching methods are performed mechanically and machines do not have enough intelligence yet. Even though some methods as referred from prior arts added some kind of interactivity during the searching and ranking process, until now no methods proposed to allow full interactivity among all search users or allow users to collaborating in the area of searching, not even doing in real time.

A new search system and method in accordance with the invention is built upon the action based virtual communities. The method is based on the interactivity among community user's actions, behaviors or recommendations that provide results to match a user's request better than simple reference counting or other relevance rankings. This searching mechanism can be used as a standalone searching engine which works with the virtual community members or combined with any existing search engines or techniques.

Figure 2:
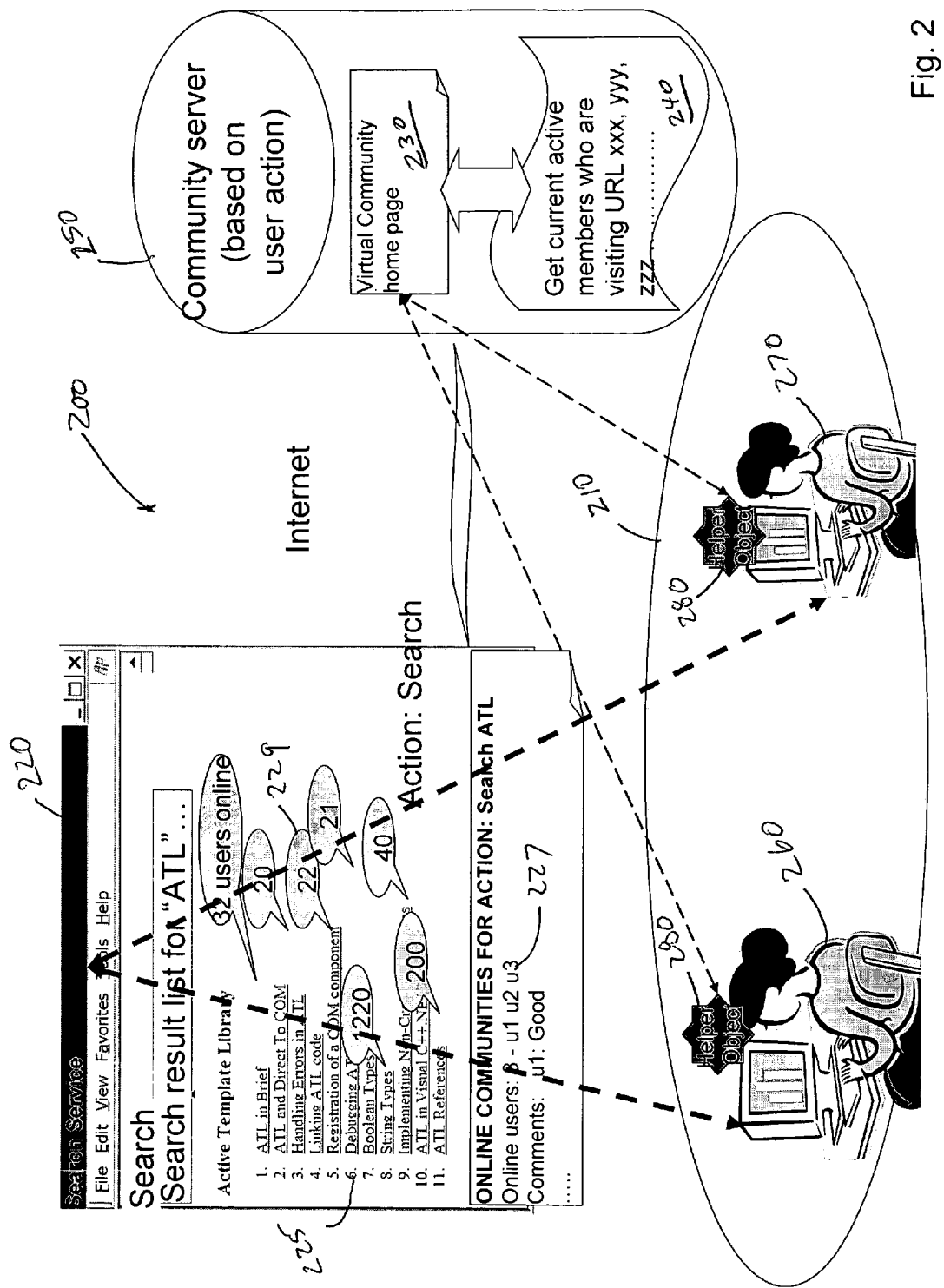
FIG. 2 is a schematic representation of a community oriented search in accordance with the invention.

The system generally designated 200 for providing a new search mechanism is shown in FIG. 2. A virtual community server 250 is operable to provide a search based virtual community 210 including users 260 and 270. Users 260 and 270 are performing a search of the term or keyword "ATL". The virtual community 210 is based on this common search. A virtual community home page 230 is served to the virtual community members by the virtual community server 150. The virtual community server 250 and/or plug-in or helper objects 280 may render the virtual community home page 230 which may include the original page 220 with the search results 225 together with community services 227.

The system 220 further comprises the provision of community member statistics 229 including the number of users accessing the searched results 225. For example the number of user currently accessing the search result "String Types" indicates that this search result is more relevant or of more interest to the current users. The user may use this information to decide which search result to access. The virtual community server 250 is operable to gather together all users currently accessing each of the searched results as in list 240.

A method of performing a search a network generally designated 400 comprises a step 410 in which a user performs a search action which is captured by the community server or the plug-in or helper object installed on the user's machine. In a step 420, the community server creates a virtual community based on the user's search action. The community server or the plug-in or helper object renders the virtual community based on the user's search action in a step 430. The rendering includes serving a community home page including community services such as community statistics and collaboration services. The community statistics may include the number of community members currently accessing a returned search result.

In a step 440, the user selects a returned search result. The community server updates the community services according the user's actions in a step 450.

Initially, the search engine will still conduct a regular indexing of the web resources in the web like a traditional search engine did, or it can use a traditional search engine as its backend service provider. During this process, it can apply any existing information retrieval techniques to the web pages and utilize web resources' hypertext/hypermedia nature and the richness of the meta-information. The search indexes could be stored in a database so users can start querying either by keywords or even natural languages. Typically, the search engine shall provide web interfaces to the public so that others are easier to use the system.

Second, all users who are conducting the searching can now consisting of the action based virtual communities and users who did the same queries can communicate with others in the world who are doing the same search. By grouping similar keywords or categories, people who search similar keywords or questions can also see each other and collaborate at real time. Furthermore, by joining and filtering the user's behavior, users are able to connect with others who are searching multiple items or accessing multiple resources from the search result.

Third, when a user starts to search an item, he enters the keywords or the queries through the public interface of the search engine. At the same time, the virtual community system, either plug-in, helper object or other mechanism provided by the system, will automatically log in the user into the community corresponding those who are querying the same keywords. This can be done through the browser plug-in or helper object and other client side application or even a proxy between client and server.

Initially the search engine will return a list of matched resources sorted by its reference ranking in the original indexing database or algorithm. The list of matching results may also include a small porting of short description or abstract for each result. Meanwhile, from the searcher's window, the community home page can display who are also conducting the same search currently or in the past, and their comments, opinions about which result is a better match. From that window, the user should be able to tell which match serves best his question. Since those suggestions are made by previous users' experience, their knowledge and experience can be passed to the new searchers.

In addition, one service can be provided inside this kind of action based community is to allow users to re-rank the result list returned by the original search engine to see if it serves their purpose or allow them to vote for the best matches in the list. All those could be done independently inside the community which provides a separate channel for users to express their opinions and give them an opportunity to participate in the searching process.

This voting and ranking process can be a formal online voting. It could also be as simple as allowing everyone to select one entry in the list that is the best match from each user's point of view. The user may also add comments on the selected entry about his opinion or why he thinks his selection is good. In addition, users in the community can share their opinion on each entry in the list returned from the search engine and can collaborate with each user inside the community, such as chatting in real time or post different comments, related links to the search or suggestions on how to use the search engine more efficiently. When the user clicks one of the entries, the browser has the option to display that new link (which typically is a web resource) in another window for the user to read on so that the original search result list window and the action based community are still kept for user to continue reading.

During this process, the ballots, ranks, comments and other information regarding the search result list for the given search criteria, or regarding each individual entry that are provided by the other community members can be persistent inside community after they go offline or switch to another query or other web resources. Even when the user is executing the query there is no other users who are also performing the same query, this user can still retrieve all the feedbacks and community information provided by others who have done the queries before to help aid selecting the right entry in the search result list during the whole search process.

In addition, if there are a lot of other people online who are also executing the same query at the time and also connect to the same action based community, any user who are doing the search can ask for help from those members in the community. This can be done by real time chat or other messaging mechanism provided by the community home page. When others who are also executing the queries see the help request from their peers, they can immediately provide real-time feedbacks, and this can greatly increase the effectiveness of the searching in general.

After the original search engine provides the initial result list with all entries listed, all the community members may have the option to re-rank, resort or vote the list according to the relevance from user's point of view. They can also create their own related links with respect to the keywords or the search items queried. Those items, including ranked entries in the list or newly created links can further be ranked and voted within the community either explicitly vote or implicitly by clicking through the links. Voting explicitly may requires the user go to a separate voting' page and vote for the item. For simplicity, the system will keep track of which items the users are interests in by just reading the item abstract or brief description and are willing to read more details by click the item. The items clicked by each users are recorded and sent back to the server to help ranking or sorting the list later—this is one way implicit ranking. Those items that rank highest will be displayed on top next time and those get least votes may be put to the bottom and may be eliminated as the list goes bigger.

In this manner, by combining the traditional search engine components such as the indexing component, and the action based communities, a new type of search engine is disclosed that is based on the user's community. Meanwhile, all the votes, ranks, comments or other user contributed stuff by the community members can be feed back to the search engine and the search engine shall utilize those information to adjust its future ranking or sorting of the result list when others execute the same or similar searches. This work can be done directly inside the original search engine indexers; or it can be done after the original searching engine indexers to re-ranking the original produced list. The process may involve re-adjusting the reference counting, linking, weighting or evaluating other meta data information inside the index database of the search engine and is up to the search engine to perform this kind of optimization.

In addition to the action based communities, this search engine can also utilize the resource based community or combinations of the two to further help users to improve the effectiveness of the search. Each entry list returned from the list may point to a web resource in the Internet which has a corresponding resource based community consists of all users who are accessing or reading that web resource. Useful and important information that relates to that web resource can be obtained by visiting the resource based virtual communities, including many real-time meta data information about each entry. The meta data information about the resource based communities can be retrieved and displayed at the same time the entry list is presented together with the entry abstract or brief description. Many of the information can reflect the popularity of the resource, for example, number of current users using the resource (entry), the total click rates of the resource and ranks by its members.

The meta data information can be displayed by either the search engine or the browser plug-in or helper object which can dynamically inject them into the displayed entry list. Of course, whoever displays the information needs to connect to the virtual community based on each of the resource (entry) to retrieve the meta information and do it for every link in the entry list. In case that the action based communities and resource based communities share the same community servers, this task of retrieving meta data information for each resource becomes trivial since it can be done before returning the search result list by the server. For example, when the user sees that the returned result list has one entry which has significant more active users accessing that resource, it may mean that entry is probably more popular than any other entries even they might rank higher.

However, in some cases, users may want to know exactly how many searchers goes to the searched result directly and do not care how many total users for that resource since some users of the resource are not clients of the search engine. In this case, the above mentioned join community of action based virtual communities with multiple actions can be used. What we want is the community that contains users who search particular keywords or items and then jumps directly to some of the result entry—the one that the searcher think must be relevant. The number of users for that action may better reflect the ranking of relevance from human being's point of view.

To be able to trace how many people clicked through the result entry and which results entry have been clicked, some help from the client side such as the browser plug-in or other helper object is needed. Those client side objects can monitor user's response to the search result list. This is similar to the technology used to perform implicitly ranking over results list provided by the search engine. The object can record which link the user has selected from the list and even the total time he spent in reading the link. In most cases, the more time a user spends reading a resource (link), the more interests he has over the resource, and the more relevant the link is with respect to his search or query. If he found the entry is not exactly what he is looking for, he probably close it right away and move to the next entry that looks more likely the right answer.

The system can collect statistical information about those implicit voting or ranking from all users performing the searches and then either send the information to the search engine or present to all community users when a new user execute the same or similar search in the future. By this way, all users can benefit immediately because they can find which link is most useful—and this information is not generated anywhere else mechanically or by analyzing the databases by from all the experience from all users that have already executed the searches.

In summary, it is the interactions among users who have used the search engine and have performed or are conducting the search that can greatly improve the effectiveness of the search engine and results from users' point of view. The more users involves in this process, the more effective for this searching method It is apparent that the above embodiments may be altered in many ways without departing from the scope of the invention. For example, the system and method of the invention may be used to resolve any dispute between community members. Further, various aspects of a particular embodiment may contain patentably subject matter without regard to other aspects of the same embodiment. Still further, various aspects of different embodiments can be combined together. Accordingly, the scope of the invention should be determined by the following claims and their legal equivalents.

What is claimed is:

1. A method for creating a plurality of action-based virtual communities for a plurality of Internet users comprising the steps of:
   providing a community server, said community server being configured to intercept only user actions performed in the Internet by each of said users, said user actions being provided to the community server by a user plug-in or helper object installed on networked user client machines; wherein user actions are selected from querying, searching, shopping, bidding, donating and painting operations while browsing the Internet;
   assigning a unique identifier in the form of URL to uniquely identify each of said user actions;
   for each of said user actions, said community server creating a corresponding action-based virtual community, said action-based virtual community members compose of users who are performing the same or similar actions;
   wherein the creation of said virtual community is done automatically without any user intervention and in real time;
   wherein multiple said communities can be grouped together by setting up a new joint community whose members composing users who are performing each of said similar actions;
   wherein each of said user can have multiple memberships when multiple actions are performed;
   wherein said community further be filtered by allowing the system or the user to specify a filter with similar keywords which is automatically matched to said community members;
   said community server automatically associating said users who performed the same or similar actions to said action-based virtual community based solely on the same or similar actions performed; and
   said community server delivering community services to members of said action-based virtual community.

2. The method of claim 1, wherein the action performed by the user comprises searching.

3. The method of claim 1, wherein the action performed by the user comprises asking questions, submitting requests, filling forms or purchasing.

4. The method of claim 1, wherein the community services comprise targeted advertising related to the action performed.

5. The method of claim 1, wherein the action performed comprises a search and the community services comprise statistical information regarding returned search results.

6. The method of claim 5, wherein the statistical information regarding the returned search results comprise count of current community users accessing the returned search results.

7. The method of claim 1, wherein the community server is configured to examine communications between the user and other networked resources.

8. A method of forming a plurality of virtual communities based on Internet search actions and keywords comprising the steps of:
   providing a community server, said community server being configured to intercept search actions conducted by a user, said search actions being provided to the community server by a user plug-in or helper object installed on networked user client machines; wherein user actions are selected from querying, searching, shopping, bidding, donating and painting operations while browsing the Internet;
   assigning a unique identifier in the form of URL to uniquely identify each of said user search actions by keywords;
   for each search keyword of search actions conducted by said user, said community server forming a corresponding virtual community related to said search keyword, said virtual community members composing of users who are conducting the same or similar explicit search actions;
   wherein the creation of said virtual community is done automatically without any user intervention;
   wherein said community can be grouped together by setting up a new joint community whose members composing users who are performing each of said similar actions;
   wherein said community can further be filtered by allowing the system or the user to specify a filter with similar keywords which is automatically matched to said community members;
   said community server automatically associating said users that conducted said same search action to said community based solely upon said search action; and
   said community server delivering community services to members of said virtual community based on the search action and keyword, said community services comprising information related to said search keyword and search results.

9. The method of claim 8, wherein the delivered community services include statistical information related to returned search results based on the users' interests.

10. The method of claim 8, further comprising:
    upon said user selecting a returned search result, said community server being configured to update real time meta information related to the selected search result.

11. The method of claim 8, wherein the delivered community services comprise providing a user voting and ranking mechanism for the returned search results based on actions of current search users in order to improve search results.

12. The method of claim 8, wherein the community server is configured to re-rank search results by implicitly tracking user actions on the search results.

13. The method of claim 8, wherein the community server is configured to track user selection of returned search results and to adjust results back to other users performing the same or similar searches.

14. The method of claim 8, wherein the community server is configured to feed user actions over the search results back to the search engine to update the search and improve the search relevancy between search result and search criteria.

15. A computer system operating in the Internet to provide action based virtual communities comprising:
- a virtual community server configured to manage a plurality of action-based virtual communities and intercept user action performed by a user in the Internet, said user actions being provided to the virtual community server by a user plug-in or helper object installed on networked user client machines wherein user actions are selected from querying, searching, shopping, bidding, donating and painting operations while browsing the Internet;
- a component configured to intercept user actions performed by a user in the Internet, and, upon detecting an action performed by said user, configured to perform the additional step of notifying said community server to create an action-based virtual community corresponding to the action performed by said user, said action-based virtual community having as members users who performed the same or similar actions in real time;
- wherein the creation of said virtual community is done automatically without any user intervention;
- wherein said community can be grouped together by setting up a new joint community whose members composing users who are performing each of said similar actions;
- wherein said community can further be filtered by allowing the system or the user to specify a filter with similar keywords which is automatically matched to said community members;
- wherein said community server is configured to automatically add said user to said action-based virtual community based solely upon said user action; and
- wherein said community server is configured to deliver community services for members of said action-based virtual community.

16. The system of claim 15, wherein the user actions include searching and the community server is configured to render community services related to returned search results.

17. The system of claim 15, wherein the community server is configured to assign a unique identifier for each of the plurality of user actions.

18. A method of providing Internet search results comprising the steps of:
- providing a community server configured to intercept actions selected from among querying, searching, shopping, bidding, donating and painting operations while browsing the Internet, said search actions being provided to the community server by a user plug-in or helper object installed on networked user client machines;
- for each search keyword of said search actions, said community server assigning a unique identifier in the form of URL and creating a corresponding action-based virtual community in real time;
- said community server automatically associating said user that conducted the search action to said action-based virtual community based solely upon said search action, members of said action-based virtual community comprising users who conducted the same or similar search actions;
- wherein the creation of said virtual community is done automatically without any user intervention;
- wherein said community can be grouped together by setting up a new joint community whose members composing users who are performing each of said similar actions;
- wherein said community can further be filtered by allowing the system or the user to specify a filter with similar keywords which is automatically matched to said community members;
- performing said search actions through another search means and retrieving search results; and
- re-arranging said search results based on knowledge within said action-based virtual communities created in correspondence with said search actions before providing said search results to the user.

19. The method of claim 18, wherein the knowledge within said action-based virtual communities is acquired by monitoring user's response to the search result.

20. The method of claim 18, wherein the knowledge within said action-based virtual communities contains which link a user has selected from the search results list or a total time a user spent on reading a search result.

* * * * *